United States Patent Office 2,794,876
Patented June 4, 1957

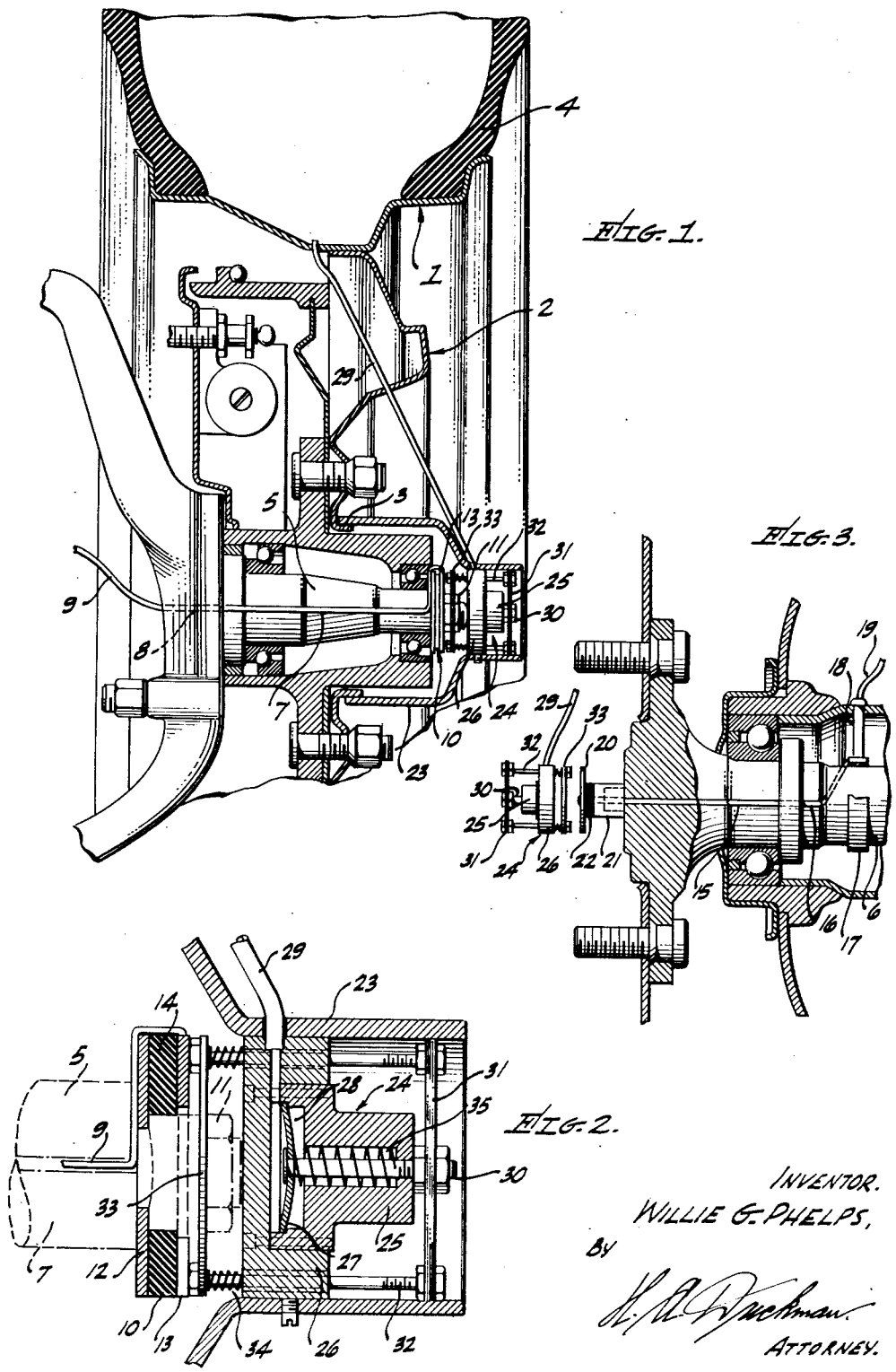

2,794,876

TIRE-PRESSURE SWITCH

Willie G. Phelps, Long Beach, Calif.

Application May 31, 1955, Serial No. 512,268

2 Claims. (Cl. 200—61.25)

This invention relates to a tire pressure switch whereby the driver of a vehicle is warned if the pressure in any one of the tires of the vehicle is reduced to a dangerous point, the warning being given through the lighting of a bulb which is visible to the driver of the vehicle.

An object of my invention is to provide a novel tire pressure switch in which the entire actuating mechanism is mounted on the wheel. Thus providing a structure which is easily mounted on dismounted on the axles of the vehicle.

Another object of my invention is to provide a novel tire pressure switch with an electrical contact, the contact being mounted on and extending through the spindle or drive shaft of the vehicle.

Another object of my invention resides in the novel pressure diaphragm construction, wherein a contact plate is activated by the pressure in the tire and engages or disengages a contact mounted on the spindle or drive shaft of the vehicle.

Still another object of my invention is to provide a novel tire pressure switch which is simple in construction, inexpensive to manufacture, effective in operation, and which can be easily mounted on a vehicle wheel of modern construction.

Other objects, advantages and features of invention may appear from the accompanying drawing, the subjoined detailed description and the appended claims.

In the drawing:

Figure 1 is a fragmentary longitudinal sectional view of a vehicle wheel with my tire pressure switch mounted thereon.

Figure 2 is a transverse sectional view of the switch actuating member and its contact.

Figure 3 is a fragmentary transverse sectional view of the rear wheel switch construction.

Referring more particularly to the drawing, the numeral 1 indicates a vehicle wheel which is of usual and well known construction, and includes a central metal disc portion 2 which is provided with a central flange portion 3. The vehicle wheel is detachably mounted in the usual and well known maner. A tire 4 is mounted on the wheel 1 and this tire is of the tubeless type and the wheel 1 acts as a means of sealing one side of the tire 4, all of which is usual and well known in this construction. The wheel 2 is mounted on either the front spindle 5 or the rear axle 6.

Considering first the construction of the front spindle 5; this spindle is formed with a surface groove 7 extending lengthwise thereof and terminating in a hole 8 at the rear of the spindle. An insulated wire 9 extends through the hole 8 and lies in the groove 7. The insulated wire 9 extends to a contact 10 which is mounted on the outer end of the spindle 5. The contact 10 is held in place by the usual nut 11 on the outer end of said spindle. The contact 10 is in the form of a ring consisting of a metallic back plate or ring 12 and a front ring 13; these rings being separated by the insulaton 14. Thus the current conducted through the wire 9 will not be grounded until it is engaged by the pneumatic unit, as will be subsequently described.

In the rear wheel mounting as shown in Figure 3, the rear shaft is grooved as shown at 15, to provide a seat for the conducting wire 16, this wire extending from a ring contact 17 on the shaft 6. A contact finger 18 engages the ring 17 and a wire 19 is attached to the finger 18 to conduct current to the ring 17 and thence to the insulated wire 16, which conducts current to the contact disc 20. The contact disc 20 is mounted on a plug 21 which screws on to the outer end of the rear shaft 6, and the disc 20 is insulated from the plug by the insulation 22.

The pneumatic contacting device is identical for all wheels and consists of a tubular housing 23 which is open at both ends. The housing 23 has a driving fit on the flange 3 of the wheel 1 and thus is fixedly mounted on the wheel at all times. The pneumatic element 24 consists of a hub portion 25 and a cover portion 26 attached thereto. A diaphragm 27 is fixedly mounted in the cavity 28 of the cover portion. A tube 29 extends from the wheel rim and thence into the cover portion 26 and communicating with the cavity 28 on one side of the diaphragm 27. Thus variation in pressure within the tire 4 will tend to flex the diaphragm 27. A post 30 extends through the hub portion 25 and is attached at one end to the diaphragm 27 and at the other end to a plate 31. A pair of actuating rods 32—32 are attached at one end to the plate 31 and at the other end to a ring 33. The ring 33 or the ends of the rods 32 engage the contact 13 in one position of the pneumatic element to ground the current for the purpose of signaling the driver, and this signal means could be a light for each of the four wheels of the vehicle, the light being in a circuit including the wires 9 or 19 and the ground. A spring 34 on each of the rods 32 urge these rods towards the contact 13 and oppose the pressure of the tire against the diaphragm 27 in the cavity 28. Also a spring 35 in the hub 25 bears against one side of the diaphragm 27 and this spring is positioned on the side of the diaphragm opposite air pressure in the cavity 28.

In operation the air pressure within the tire 4 will be conducted through the pipe 29 and will bear against one side of the diaphragm 27 pushing the post 30 outwardly, and this action will be transmitted through the rods 32 to the plate 33 and will pull this plate away from the contact 13. This is the position of the parts under normal air pressure in the tire 4. If the air pressure decreases in the tire the pressure against the diaphragm 27 will be reduced, and thus the springs 34 will push the plate 33 against the contact 13, thereby grounding the current from the wire 9 or 19, and thus causing a light to go on indicating that the air pressure is low in one of the tires.

Having described my invention, I claim:

1. A tire pressure switch for pneumatic tires, including a wheel on which the tire is mounted, the alarm comprising a pneumatic element, said element having a cavity therein, a diaphragm mounted in said cavity, a post mounted on the diaphragm and projecting from said element, a pneumatic conduit extending from the tire to said cavity, whereby the tire pressure is exerted in the cavity, an electrical contact on the shaft on which the wheel is mounted, a ring engageable with the electrical contact, means attaching the ring to said post, said ring engaging the electrical contact in one position of said ring, a housing, means fixedly mounting said housing on the wheel at the center thereof, and means detachably mounting said pneumatic element in the housing.

2. A tire pressure switch for pneumatic tires, including a wheel on which the tire is mounted, the alarm comprising a pneumatic element, said element having a cavity therein, a diaphragm mounted in said cavity, a post mounted on the diaphragm and projecting from said element, a pneumatic conduit extending from the tire to said cavity, whereby the tire pressure is exerted in the cavity, an electrical contact on the shaft on which the wheel is mounted, a ring engageable with the electrical contact, means attaching the ring to said post, said ring engaging the electrical contact in one position of said ring, spring means engaging the first named means to urge said means into engagement with the electrical contact, a housing, means fixedly mounting said housing on the wheel at the center thereof, and means detachably mounting said pneumatic element in the housing.

References Cited in the file of this patent

UNITED STATES PATENTS

| | | |
|---|---|---|
| 2,239,676 | Henry | Apr. 29, 1941 |
| 2,258,384 | Harrington | Oct. 7, 1941 |
| 2,494,831 | Phelps | Jan. 17, 1950 |
| 2,523,594 | Sagaser et al. | Sept. 26, 1950 |